United States Patent [19]

Nakamura et al.

[11] 4,110,901
[45] Sep. 5, 1978

[54] METHOD OF FABRICATING ROTOR COIL FOR CORELESS MOTORS

[75] Inventors: Yoshimitsu Nakamura, Settsu; Hajime Kojima, Hirakata, both of Japan

[73] Assignee: Matsushita Electric Works, Ltd., Osaka, Japan

[21] Appl. No.: 811,295

[22] Filed: Jun. 29, 1977

[30] Foreign Application Priority Data

Jun. 30, 1976 [JP] Japan ................................. 51-78066

[51] Int. Cl.$^2$ ............................................. H02K 15/02
[52] U.S. Cl. ....................................... 29/598; 29/628; 310/42
[58] Field of Search ................... 29/598, 628; 310/42, 310/264, 265, 266

[56] References Cited

U.S. PATENT DOCUMENTS 3,995,364  12/1976  Kristiansen ........................... 29/598

Primary Examiner—Carl E. Hall
Attorney, Agent, or Firm—Burns, Doane, Swecker & Mathis

[57] ABSTRACT

A method of fabricating cylindrical rotor coil for use in coreless motors is provided, wherein coated insulation film on coil wire at a plurality of positions to be located at an axial end edge of the rotor coil cylindrically wound is removed for connection with commutator segments during winding operation of the wire into cylindrical shape. The winding operation is preferably intermittently interrupted for performing the insulation film removal. Advantageously, the removal is performed by dipping the particular positions into a molten state solder, whereby the film is thermally fused and removed and exposed conductor parts are simultaneously coated with the solder. The film may be removed, alternatively, by means of high frequency induction heat or high voltage discharge arc.

7 Claims, 9 Drawing Figures

METHOD OF FABRICATING ROTOR COIL FOR CORELESS MOTORS

This invention relates to a method of fabricating rotor coil for use in coreless motors.

In coreless motors of the type in which a rotor comprising a cylindrically wound coil is rotated coaxially around a cylindrical stator of a permanent magnet, required connection of the rotor coil with respective commutator segments has been performed, as has been shown typically in U.S. Pat. No. 3,360,668, by tapping the coil out of generally one of axial end edges of its cylindrical shape at several spaced positions corresponding in number to the segments and connecting these taps of the coil to the respective segments. According to such conventional method, winding operation of material coil wire into the cylindrical shape has been caused to be rather complicated as it has been necessary to temporarily interrupt the operation several times and to hang the wire on tap-pins for providing the taps. In order to electrically connect these taps to the respective commutator segments, further, still complicated works have been required in such that respective legs of each coil tap having a U-shape are twisted together, insulative coating of urethane or the like resin on the material coil wire is removed from such twisted taps by means of a dipping or the like, a solder is placed on exposed conductor of thus coating-removed taps, the respective taps with the solder are bent toward the respective segments and thereafter the taps are respectively soldered to each segment. According to such conventional method as above, further, there has been involved such a defect that winding turns of the coil are liable to be disordered at tapped positions due to that the taps are twisted and such disordered turns of the coil often cause a short-circuiting or breakage of the coil wire to occur during a forming operation with a heat press of the wound coil into a precise cylindrical shape. As another measure, there has been employed a method in which the coil is sequentially wound into the cylindrical shape, the insulative coating of the coil is peeled off at the positions on the axial end edge of the cylindrical shape to be connected to the commutator segments and thus exposed conductor parts at such positions are electrically connected to the respective segments by means of the soldering. In this case, too, there has been such defect that a preliminary determination of the particular positions in the cylindrically wound coil to be connected to the segments have to require such a troublesome step of counting winding turns of the coil and the peeling work of the insulative coating is also troublesome. The present invention has been suggested to solve such problem as above in the conventional methods.

According to the present invention, the problems have been successfully solved by removing the insulative coating of the coil at the positions to be connected to the commutator segments and continuing the coil winding operation.

Primary object of the present invention is therefore to provide a method of fabricating the cylindrically wound rotor coil for the coreless motor at a high efficiency without requiring any tapping during the winding operation.

Another object of the present invention is to provide a method capable of fabricating the cylindrically wound rotor coil at an inexpensive cost.

other objects and advantages of the present invention shall be made clear upon reading the following descriptions of the invention detailed with reference to accompanying drawings, in which:

FIGS. 3 and 4 are explanatory views for an exemplary coil winding of the rotor coil used in the present invention, in which FIG. 3 is a developed view of the coil as wound and FIG. 4 is a schematic perspective view showing the manner in which the coil is wound;

Figure 1:
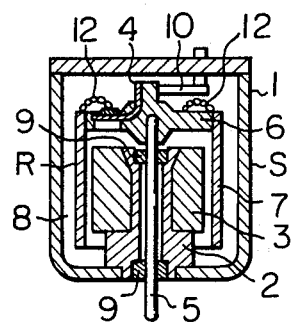
FIG. 1 is a sectioned view showing an entire structure of a conventional coreless motor.
Figure 2:
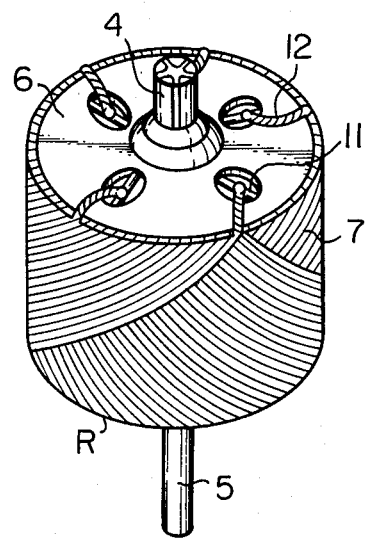
FIG. 2 is a perspective view as magnified of the rotor employed in the motor of FIG. 1.

Referring first to a general structure of the coreless motor which comprises a rotor using cylindrical coil fabricated by the typical conventional method as shown in FIGS. 1 and 2, a substantially cup-shaped yoke 1 made of a magnetic material houses therein a cylindrical permanent magnet 3 as coaxially fixed through a fixture member 2 of a magnetic material having an axial hole to closed bottom of the cup-shaped yoke 1, whereby a stator S of the motor is formed. A rotor R of a reversed cup-shape comprises a disk-shaped coil holding plate 6 made of a non-magnetic and electrically insulative material and having on the upper surface a set of commutator segments 4 secured thereto radially and on the lower surface a rotary shaft 5 fixed at an end of the shaft to axially extend from the disk and a cylindrical coil 7 mounted at an axial end of its cylindrical shape to outer periphery of the disk 6, and the rotor R is rotatably supported within the cup-shaped yoke 1 in such that the cylindrical coil 7 is disposed in a cylindrical gap 8 defined between the yoke 1 and the permanent magnet 3 while the rotary shaft 5 is inserted in the axial hole of the fixture member 2 as rotatably born with shaft bearings 9 of a non-magnetic material and secured to both ends of the axial hole of the member 2 so as to extrude the other end out of the yoke 1. Brushes 10 are brought into contact with the commutator segments 4 on the rotor R for flowing an electric current to the rotor coil 7 through the segments. For this purpose, the segments 4 on the holding disk 6 are respectively connected to each terminal end 11 of the respective taps 12 of the coil 7 formed at the axial end secured to the disk 6 by means of a welding or soldering. In the conventional commutator motor of the kind referred to above, it has been thus necessary to provide the coil taps 12 for connecting the coil through these taps to the terminal ends 11 of the commutator segments 4 so that the fabrication of the coil could be complicated and troublesome, resulting in a high fabricating cost.

Figure 3:
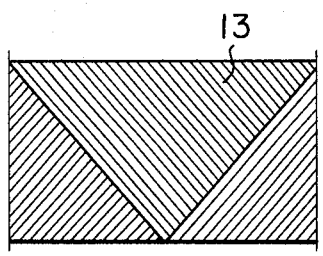
Figure 4:
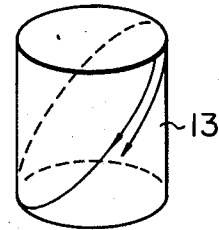

Referring next to an example of coil winding of the rotor used in the present invention with reference to FIGS. 3 and 4, a material coil wire 13 is wound so as to pass diagonally through the entire winding width of the cylindrical coil while the wire runs over a one polarity range to reach the other polarity range of the magnetic field and to be sequentially bent back diagonally at the respective ends of the cylindrical shape.

Figure 5:
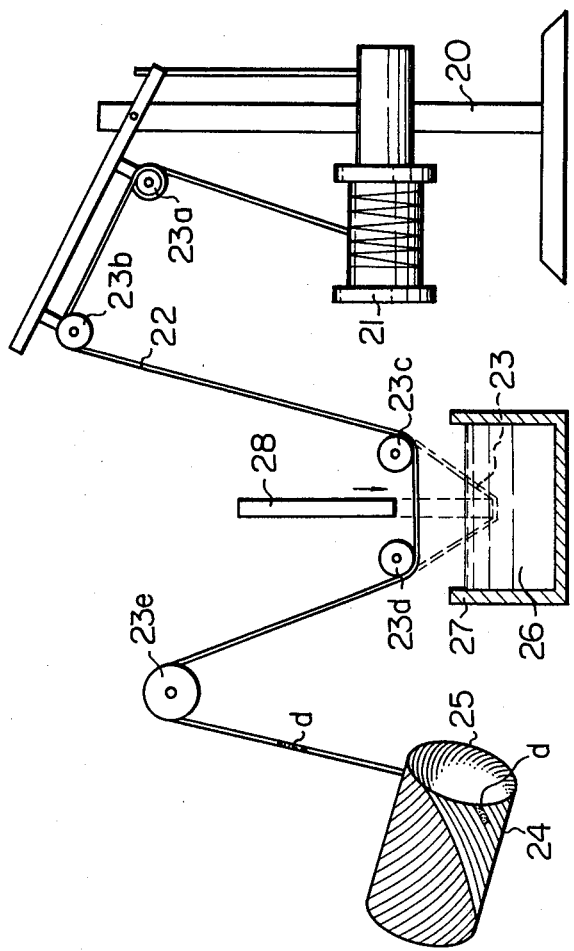
FIG. 5 is a schematic view showing an embodiment of the coil fabricating method according to the present invention.

In FIG. 5, there is shown schematically an embodiment of the method of fabricating the rotor coil according to the present invention, in which a chassis 20 has a reel bobbin 21 mounted thereto rotatably, a material coil wire 22 coated with an insulative film and wound on the bobbin 21 is paid out of the bobbin through a tension roller 23a and following rollers 23b to 23e and the wire 22 is wound into a cylindrical coil 24 by means of a coil winder (not shown) in such manner as described with reference to FIGS. 3 and 4. While thus the wire 22 is paid through the rollers, the coated insulative film on the wire is removed over a fixed region at respective positions which correspond to respective bent-back parts 25 at an axial end edge of the cylindrical shape of the coil 24 of every predetermined number of turns, so that a plurality of conduction parts $d$ of the coil will be provided with thus exposed conductor wire of the coil. Preferably, a solder coat is formed on each of the conduction parts $d$ and, for this end, a measure as will be referred to next is employed according to the present embodiment. That is, a batch of solder 26 in molten state is filled in a vessel 27, the wire 22 is disposed to run above the molten solder vessel 27 as held between a pair of the rollers 23c and 23d, and a rod 28 reciprocally movable in vertical directions is disposed further above the wire 22 between the rollers 23c and 23d. With this arrangement, the coil winder is intermittently stopped to interrupt the running of the wire temporarily and the rod 28 is moved in the direction shown by an arrow to its position shown by a dotted line in the drawing, then the wire 22 is partially caused by the moved rod 28 to be dipped in the molten solder 26 as shown by dotted line, whereby the insulative film on the wire is melted and removed by means of melting heat of the solder 26 and at the same time the exposed conductor of the wire is coated with the solder, whereby the conduction part $d$ coated with the solder is formed. The rod 28 is then returned to the initial position so that the wire 22 with thus formed solder-coating will be straightened back between the rollers 23c and 23d, and the winder is again driven to continue the coil winding operation. The winding and dipping operations are properly adjusted so that, when a certain number of winding turns is reached, the thus formed conduction part $d$ with the solder-coating will be precisely positioned at an end edge of the cylindrical coil and bent back at the edge position, whereby the respective conduction parts $d$ are disposed at corresponding positions to those of the conventional taps.

In the case when a coil wire of a conductive core having a diameter of about 0.05 to 1.0 mm which is coated with an insulative film of, for example, polyurethane resin in a thickness of 20 to 30 microns, it is preferable that the molten solder is maintained at a temperature of 350° to 450° C. and the coil wire is dipped in the molten solder for a period of about 2 to 10 seconds.

An example of the rotor coil formation employing such coil fabricated as in the foregoing shall be referred to in the followings.

Figure 6:
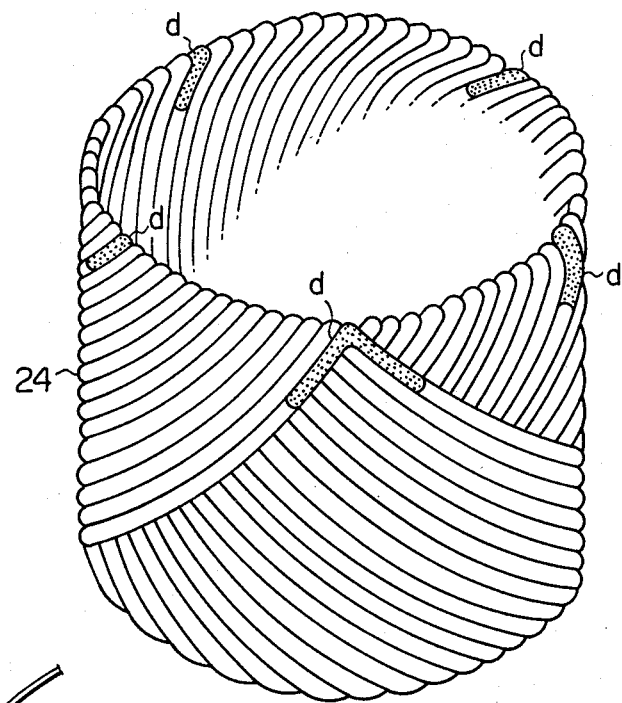
FIG. 6 is a perspective view showing a coil as magnified which is fabricated according to the embodiment of FIG. 5.
Figure 7:
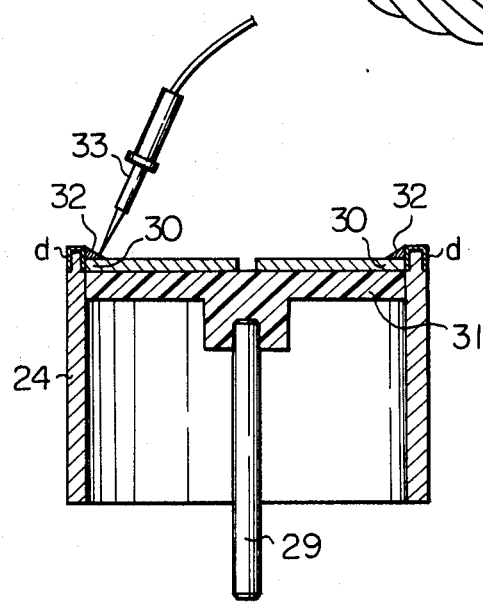
FIG. 7 is a schematic sectioned view of a rotor employing the coil of FIG. 6 and showing electric connection of the coil to commutator segments.

In FIG. 6, there is shown the coil 24 formed in the manner described above, in which a plurality of the conduction parts $d$ of the coil are provided at an end edge of its cylindrical shape. In making the rotor with this coil 24, as shown in FIG. 7, a disk-shaped coil holding plate 31 having a plurality of commutator segments 30 made of an electrically conductive metal and secured to a surface which is the upper surface in the drawing of the plate and a rotary shaft 29 fixed at an end to axial center on the other surface which is the lower surface in the drawing of the plate 31 is fitted to inner periphery of the cylindrical coil 24 adjacent an axial end thereof so as to dispose the rotary shaft 29 coaxially through the coil. In this case, the respective conduction parts $d$ of the coil disposed at the axial end adjacent which the disk-shaped plate 31 is fitted are positioned to be substantially equally spaced and the commutator segments 30 corresponding in number to the conduction parts $d$ are radially arranged as insulated from one another so as to extend respectively from the center to the periphery of the disk-shaped plate 31 having a diameter substantially equal to inner diameter of the cylindrical coil 24, so that respective radial ends of the segments 30 may contact with each conduction part $d$. The outer periphery of the disk-shaped plate 31 is secured to the coil 24 by means of a bonding agent, whereas the radial ends of the segments 30 are electrically connected to the conduction parts $d$ with a solder 32 deposited by means of a soldering iron or gun 33 which is shown in a reduced scale.

While not specifically shown in the drawing, both of starting and terminating ends of the wound coil are normally located at the same position on the axial end of the cylindrical coil. Therefore, it is preferable that these ends are cut to be of a length slightly extending from the edge, twisted together, subjected to the removal of their insulative coating film and utilized as one of the conduction parts $d$ to be connected to one of the commutator segments 30 with the soldering.

Figure 8:
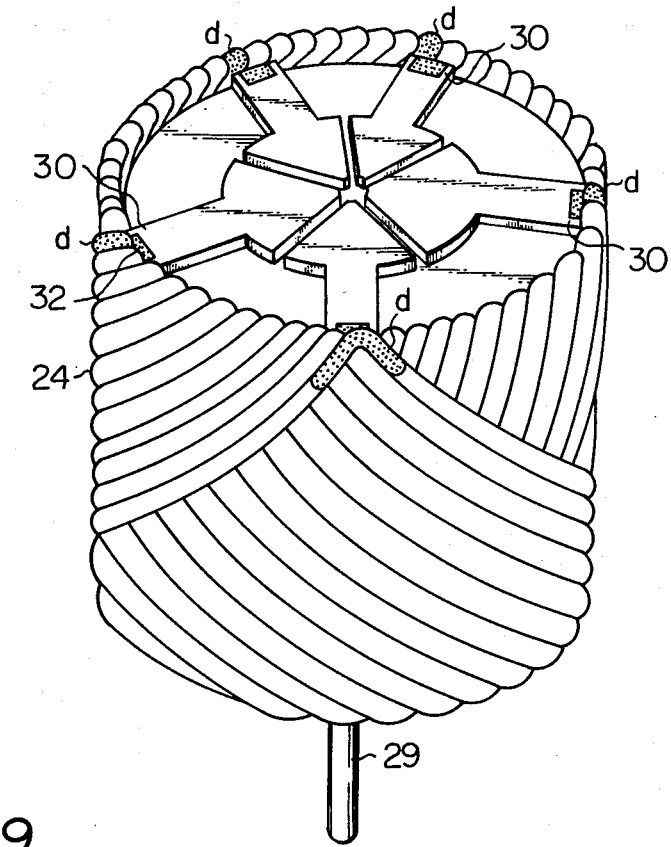
FIG. 8 is a perspective view of the rotor shown in FIG. 7.

FIG. 8 shows the thus formed rotor in a perspective view.

Figure 9:
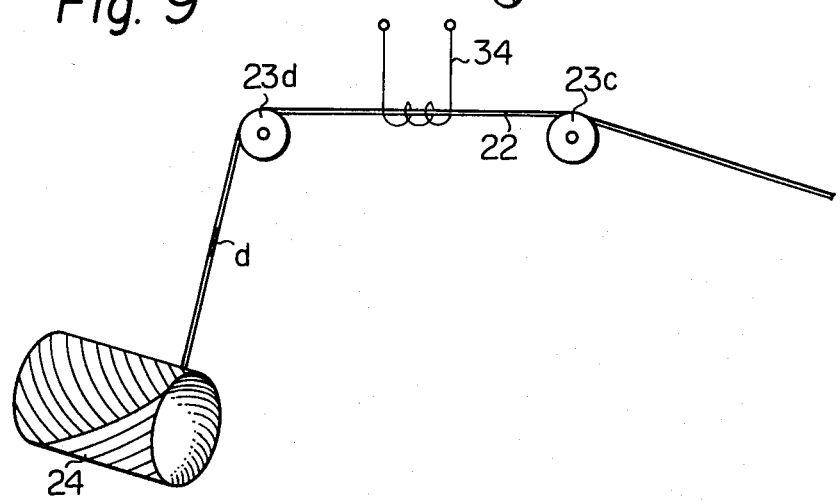
FIG. 9 is a schematic view showing another embodiment of the method according to the present invention.

In FIG. 9, another embodiment of the method according to the present invention is schematically shown, in which the same parts as those in the case of FIG. 5 denoted by the reference numerals 20, 21, 23a and 23b are omitted. According to this embodiment, there is provided a solenoid 34 at an intermediate position between the two rollers 23c and 23d so as to surround the coil wire 22, and this solenoid 34 is disposed within an oxygen-less atmosphere. During the winding operation, the coil winder is intermittently stopped and a high frequency electric current is passed through the solenoid 34, so that the insulative coating film on the wire 22 is fused and removed by a heat generated due to the current over a length determined by the size of the solenoid 34 and thereby the conduction parts $d$ are formed at spaced positions on the wire 22 which are to be disposed at radially spaced positions on an axial end edge of the cylindrically wound coil 24. In performing the method of this embodiment, it is preferable to employ an alternating current of about 500 KHz to 3 MHz as the current to be passed through the solenoid 34 and to heat the wire with such current for a period of about 2 to 10 seconds and at a temperature of about 350° to 450° C.

In the case when the coil wire is coated with an insulative film of such a material as polyester series amide, imide or the like which having a high melting point, it is preferable to scrape off the film with a mechanical measure for forming the conduction parts. In the case of the high melting point coating film, further, there can be employed another measure than the mechanical scraping, according to which a cut or scratch reaching the inner conductor is preliminarily given to the film by any mechanical measure, such cut or scratched portion of the wire is positioned in a gap between a pair of opposing electrodes and a high voltage is applied between these electrodes to cause a discharge arc in the gap, thereby the film is thermally fused and simultaneously removed.

According to the present invention, as has been described above, the insulative coating film on the material coil wire is removed at spaced positions during the coil winding is being performed and the connecting parts of the coil with the commutator segments are formed at the same time of the coil winding operation, so that the connecting parts can be obtained without requiring such conventional steps of performing the tappings during the winding operation, twisting the tapped parts of the coil and removing the insulative coating film from the twisted taps, whereby the rotor coil for the coreless motors can be fabricated at a high efficiency.

We claim:

1. A method of fabricating a rotor coil for coreless motors comprising the steps of removing at least a portion of a coated insulation film of an insulation coated wire paid out of a bobbin at predetermined spaced positions, and winding said wire subjected to said removing step into a cylindrical coil by means of a coil winder so that said positions with the insulation film removed will be located at an axial end edge of said cylindrically wound coil for connection with respective commutator segments.

2. A method according to claim 1 wherein said insulation film removing step is performed during temporary interruptions of said winder being operated, and wherein the winder is operated again after the removal of the insulation film to continue the winding.

3. A method according to claim 1 wherein said insulation film removing step is performed by dipping said predetermined spaced positions of the wire into a solder in a molten state so that said insulation film at said dipped positions is fused and removed by melting heat of said solder and thereby also coating the exposed conductor at the predetermined spaced positions of the wire with the solder.

4. A method according to claim 3 wherein a wire coated with polyurethane resin film is used as said insulation coated wire.

5. A method according to claim 3 wherein said solder in molten state is at a temperature of 350° to 450° C.

6. A method according to claim 1 wherein said insulation film removing step is performed by passing said insulation coated wire through a solenoid in its axial direction and through which a high frequency electric current is being passed.

7. A method according to claim 1 wherein said insulation film removing step is performed by mechanically partly exposing the inner conductor of said wire and causing thus partly exposed conductor part of the wire to be subjected to a high voltage discharge arc so as to thermally fuse and remove the film.

* * * * *